united states patent [19]

(12) United States Patent
Melis et al.

(10) Patent No.: US 7,282,809 B2
(45) Date of Patent: Oct. 16, 2007

(54) INTERFACE CIRCUIT BETWEEN A DIRECT-CURRENT VOLTAGE SOURCE AND A CIRCUIT FOR DRIVING A LOAD, PARTICULARLY FOR USE IN MOTOR-VEHICLES

(75) Inventors: Salvatore Melis, Rivoli (IT); Kamal Mourad, Turin (IT); Claudio Priotti, Cavour (IT)

(73) Assignee: Sila Holdings Industriale S.p.A., Nichelino (IT)

( * ) Notice: Subject to any disclaimer, the term of this patent is extended or adjusted under 35 U.S.C. 154(b) by 460 days.

(21) Appl. No.: 10/395,228

(22) Filed: Mar. 25, 2003

(65) Prior Publication Data
US 2003/0179034 A1    Sep. 25, 2003

(30) Foreign Application Priority Data
Mar. 25, 2002    (IT)    ............................ TO2002A0263

(51) Int. Cl.
*B60L 1/00*    (2006.01)
*B60L 3/00*    (2006.01)
*H02G 3/00*    (2006.01)
(52) U.S. Cl. ........................................................ 307/9.1
(58) Field of Classification Search ................. 307/9.1
See application file for complete search history.

(56) References Cited

U.S. PATENT DOCUMENTS

| 5,541,531 | A | * | 7/1996 | Kultgen ........................ 326/62 |
| 5,710,699 | A | * | 1/1998 | King et al. .................. 363/132 |
| 6,046,896 | A | * | 4/2000 | Saeki et al. .................... 361/86 |
| 6,534,939 | B2 | * | 3/2003 | Kato et al. ................... 318/266 |

2001/0033501 A1    10/2001    Nebrigic

FOREIGN PATENT DOCUMENTS

EP    0 708 515 A1    4/1996

* cited by examiner

*Primary Examiner*—Stephen W. Jackson
*Assistant Examiner*—Carlos Amaya
(74) *Attorney, Agent, or Firm*—Sughrue Mion, PLLC

(57) ABSTRACT

An interface circuit is described for use between a direct-current voltage source and a circuit for the pulsed driving of a load such as an electric motor, in parallel with which at least one high-capacitance capacitor is connected, the interface circuit comprising
  a MOSFET transistor connected to a control circuit suitable for driving the transistor in accordance with predetermined procedures.

The interface circuit comprises a first supply terminal and a second supply terminal which are intended operatively to be connected to the voltage source, permanently and temporarily, respectively.

A circuit for controlling current conduction in the MOSFET transistor is connected to the gate of the transistor and, each time it receives an activation signal, brings about an initial transitory stage in which a progressively increasing current is conducted through the transistor and in which the transistor is operating in the linear region of its characteristic, and a subsequent, or steady-state stage in which the transistor is operating in conditions of substantial saturation.

An enabling circuit is connected to the second supply terminal to keep the MOSFET transistor non-conductive when the second supply terminal is disconnected and to supply an activation signal to the circuit for controlling current conduction when that terminal is connected to the voltage source.

12 Claims, 3 Drawing Sheets

US 7,282,809 B2

INTERFACE CIRCUIT BETWEEN A DIRECT-CURRENT VOLTAGE SOURCE AND A CIRCUIT FOR DRIVING A LOAD, PARTICULARLY FOR USE IN MOTOR-VEHICLES

BACKGROUND OF THE INVENTION

The present invention relates to an interface circuit, particularly for use in motor vehicles between a direct current voltage source such as a battery and a circuit for the pulsed driving of a load such as an electric motor, in parallel with which a capacitor with a high capacitance is connected.

In circuits that are used for the pulsed driving of large loads, for example, with PWM (pulse-width modulation), for example, in order to keep the voltages at the terminals of the load constant with variations in the supply voltage, or to render the speed of operation of an electric motor variable, it is necessary to use very high-capacitance filtering capacitors, typically of the electrolytic type, in order to reduce electromagnetic emissions in accordance with the regulations in force.

In the automotive field, where a battery supply voltage of about 12V is typically available, the currents which flow in the supply wires of the electromechanical actuators typically have high intensities and this involves an increase in the capacitance of the above-mentioned capacitors. These capacitors have to have a very low series resistance (ESR) and to be able to withstand a ripple current which increases with increases in the load.

During the driving of such loads, the so-called "load dump" condition may also arise; this typically happens when the generator of the motor vehicle is disconnected from the battery suddenly, for example, owing to a vibration or a shock, whilst it is operating with a large current in order to charge the battery. The result of such a disconnection is a rapid decrease in the current flowing through the generator and a very high pulsed voltage of the order of hundreds of volts is consequently generated, in accordance with the well-known equation $V=LdI/dt$.

In selecting the dimensions for the electronic components of the interface circuitry for a load for automotive use it is therefore necessary to take account of the voltage pulse which may be produced in a "load dump" condition. However, various problems arise.

In the first place, there is a problem with regard to electrolytic capacitors since their size increases considerably with increases in their nominal working voltage, for a given capacitance value.

Moreover, if a MOSFET is used for driving an inductive load, in order to reduce losses in conduction it would be necessary to reduce the drain-source resistance $R_{DSon}$ but this conflicts with the need to have a high breakdown voltage $V_{DS}$.

In circuits which comprise at least one high-capacitance capacitor, there is also the problem of limiting their initial load current or "inrush current". During the initial transitory stage of the charging of a discharged capacitor having a capacitance, for example, of a few hundred microF, the current value is limited in practice purely by the resistance of the wiring and/or of the connectors as well as by the output limitations of the voltage source available, for example, 400A in the case of a motor-vehicle battery. It is therefore necessary to select correctly the dimensions of the wiring and the connectors as well as of all of the electronic components which are in series with the line through which the current is supplied to the capacitor/s in question, such as reversed-polarity protection diodes, etc.

An interface circuit of the type specified above for protecting a load against an excessive voltage pulse is known from European patent application EP-A-0 708 515. This known circuit comprises a channel-depletion MOSFET transistor and does not permit controlled limitation of the inrush current. The breakdown voltage $V_{DS}$ must be greater than the "load dump" voltage and it is therefore essential to use a protection diode in parallel between the drain of the MOSFET and the earth.

With reference to FIG. 1, a known solution which enables the inrush current to be limited is constituted by a circuit comprising a resistor R, through which the filtering capacitor C is charged, and a relay (or a MOSFET) M which is in parallel with this resistor and is closed when the voltage at the terminals of the capacitor C has reached a predetermined value. This solution does not overcome the problem of maintaining low absorption when the vehicle is in the inoperative (standby) stage if the capacitor C has leakages; this condition may arise in particular with electrolytic capacitors and could lead to permanent failure of the circuit if the leakages were to exceed the current permitted by the resistor R.

Another known solution for overcoming the problem of limiting the inrush current is that of inserting a MOSFET device M in series with the filtering capacitor C (FIG. 2). The filtering efficiency of the capacitor/s is reduced since it/they have the resistance $R_{DSon}$ in series with their own intrinsic resistance.

SUMMARY OF THE INVENTION

The object of the present invention is to provide an interface circuit of the above-mentioned type which can actively limit the inrush current initially supplied to the high-capacitance capacitor/s connected in parallel with the load and which also advantageously enables consumption to be limited. A further object is to provide a circuit which can achieve effective protection of the components.

This and other objects are achieved, according to the invention, by an interface circuit the essential characteristics of which are defined in appended claim 1.

BRIEF DESCRIPTION OF THE DRAWINGS

Further characteristics and advantages of the invention will become clear from the following detailed description which is given purely by way of non-limiting example with reference to the appended drawings, in which.

DETAILED DESCRIPTION OF THE DRAWINGS

Figure 1:
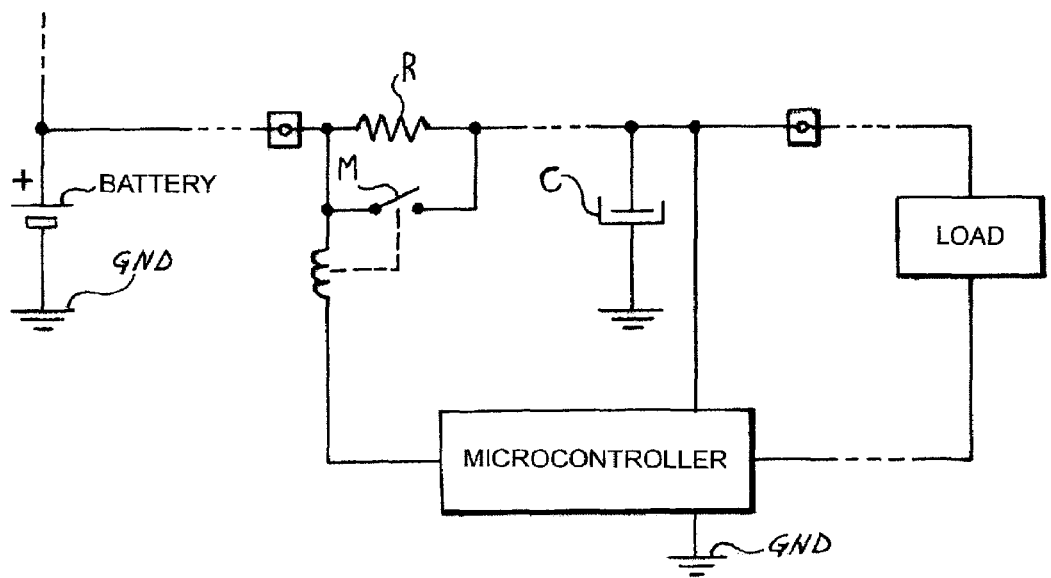
FIGS. 1 and 2, which have already been described, show solutions according to the prior art.
Figure 2:
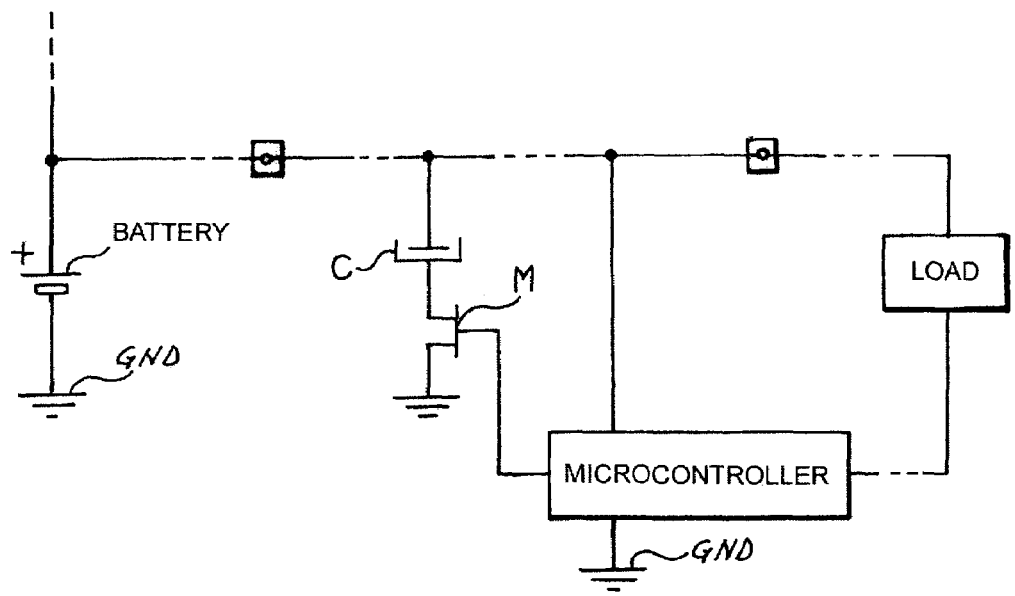
Figure 3:
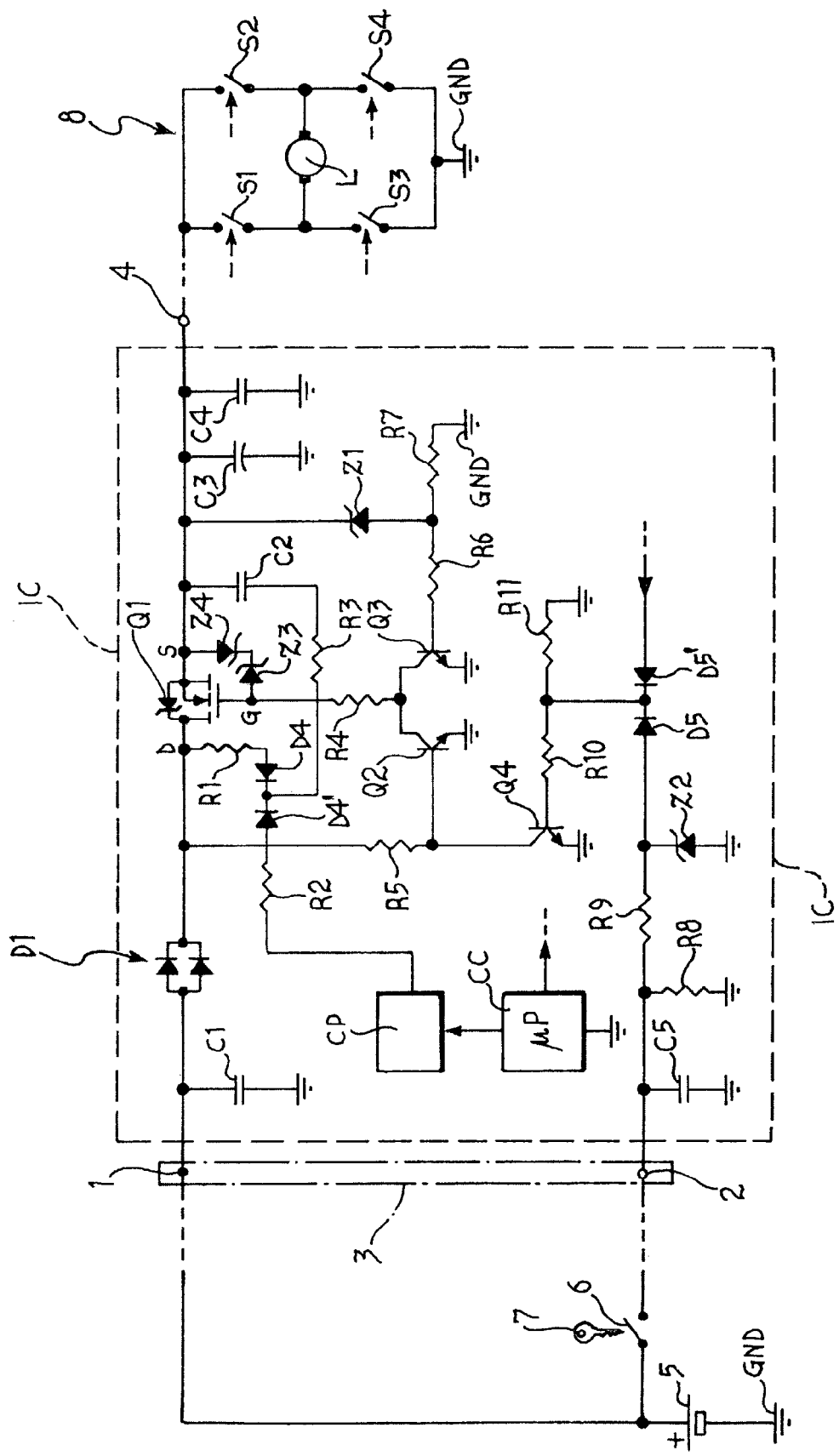
FIG. 3 shows, by way of example, a layout of an embodiment of a circuit according to the invention.

An interface circuit according to the invention is generally indicated IC in FIG. 3.

This circuit has two supply terminals 1 and 2, which are advantageously mounted in a single connector 3, and an output terminal 4.

The supply terminal 1 is intended to be connected permanently to a direct-current supply voltage source 5, such as a motor-vehicle battery. In the embodiment shown, the voltage source 5 has its positive terminal connected to the interface circuit IC and its negative terminal connected to the earth GND.

The supply terminal 2, on the other hand, is intended to be connected to the voltage source 5 when a switch 6 interposed between them is closed. This switch may be incorporated, for example, in a motor-vehicle ignition and starting switch, operable by means of a key 7.

The output terminal 4 is connected to a circuit 8 for driving a load L.

In the embodiment shown, the load L is a direct-current electric motor and the associated driver circuit 8 is a so-called H-shaped bridge circuit and comprises, in known manner, four electronic switches S1-S4 which are, for example, MOSFET transistors.

The driver circuit 8 is connected between the output terminal 4 of the interface circuit IC and the earth GND.

The interface circuit IC comprises a MOSFET transistor Q1 which has its drain-source path D-S arranged substantially in series between the supply terminal 1 and the output terminal 4.

A pair of diodes D1 for protection against polarity-reversal of the voltage of the source 5 is disposed between the supply terminal 1 and the drain D of Q1. An input capacitor C1 is connected between the terminal 1 and the earth.

A further capacitor C2 is connected between the gate and the source of the MOSFET transistor Q1.

Two further capacitors, indicated C3 and C4, are connected between the output terminal of the interface circuit and the earth. The capacitor C3 is, for example, a 1000 microF electrolytic capacitor with a nominal voltage of 35V. The capacitor C4 has, for example, a capacitance of the order of about one hundred nF.

These capacitors C3, C4 are intended to reduce low-frequency and high-frequency electromagnetic emissions in the band concerned, respectively.

A resistor, indicated R1, is connected between the drain of Q1 and the anode of a diode D4 which has its cathode connected to the gate G of Q1. The cathode of D4 is connected to the cathode of a similar diode D4' the anode of which is connected, via a resistor R2, to the output of a circuit suitable for driving an n-channel MOSFET with its source connected to the supply voltage, such as a charge pump CP.

A further resistor R3 is connected in series with the capacitor C2, between the gate G and the source S of Q1.

The gate G of the MOSFET transistor Q1 is connected, via a resistor R4, to the collectors of two npn bipolar transistors Q2 and Q3 having their respective emitters connected to the earth.

A resistor R5 is connected between the drain of Q1 and the base of Q2 which is also connected to the collector of a further npn bipolar transistor Q4 which has its emitter connected to the earth.

The base of the transistor Q3 is connected to the anode of a Zener diode Z1 via a resistor R6. This Zener diode Z1 has its cathode connected to the source S of Q1 and its anode connected to the earth via a resistor R7.

An input capacitor, indicated C5, is connected between the supply terminal 2 and the earth. A resistor R8 is connected in parallel with this capacitor.

A resistor R9 is connected between the supply terminal 2 and the cathode of a Zener diode Z2 which has its anode connected to the earth.

The cathode of the Zener diode Z2 is connected to the base of the transistor Q4 via a diode D5 and a resistor R10. A resistor R11 is connected between the resistor R10 and the earth.

Two further Zener diodes, indicated Z3 and Z4, are connected in opposition to one another between the gate G and the source S of the MOSFET transistor Q1.

The charge pump CP is controlled by a control circuit CC comprising, for example, a microprocessor. The control circuit CC has an output connected to the base of the transistor Q4 via a diode D5'.

The diodes D4 and D4', as well as the diodes D5 and D5' are interconnected so as to form so-called "OR" circuits.

The circuit described above is arranged to operate in the following manner.

It is assumed that the switch 6 is initially open. If, in this condition, the interface circuit is connected to the voltage source 5 by its supply terminals 1 and 2, the connector 3 does not undergo any stress.

As a result of the connection of the terminal 1 to the positive terminal of the voltage source 5, the transistor Q2 is polarized and conductive. This transistor thus keeps the MOSFET Q1 in the non-conductive condition. All of the devices downstream of Q1 and, in particular, the capacitors C3, C4 and the driver circuit 8 with the associated load L, are disconnected from the power source.

In this condition, which may be defined as a "standby" condition, the interface circuit consumes a low current (a few microamperes), substantially equal to the sum of the currents which flow through the resistors R1, R4 and R5.

When the switch 6 is closed, the supply terminal 2 is also connected to the voltage source 5. The transistor Q4 consequently becomes conductive, causing the transistor Q2 to become non-conductive.

Starting from the closure of the switch 6, the capacitor C2 starts to be charged with a time constant which depends on its capacitance and substantially on the sum of the resistances of the resistors R1 and R3.

Figure 4:
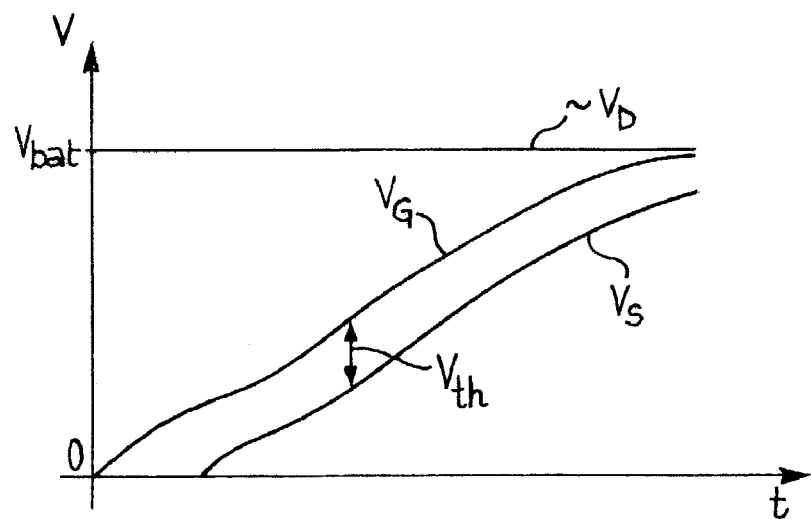
FIGS. 4 and 5 are graphs which show the curves of voltages in the circuit according to FIG. 3, as functions of time t.

The potential $V_G$ (relative to earth) of the gate G of the MOSFET transistor starts to rise and, when it has exceeded its typical threshold value, current starts to be conducted by Q1. The gate potential $V_G$ and the source potential $V_S$ of the transistor Q1 rise, maintaining a potential difference equal to the threshold voltage $V_{th}$ of the MOSFET Q1, by virtue of the feedback circuit constituted by C2-R3. The value of Vbat (the voltage of the battery 5), reduced by the threshold voltage $V_{th}$ of the MOSFET, is reached by the source with the same time constant, determined by R1-R3-C2 (FIG. 4).

Throughout this stage, the MOSFET transistor Q1 conducts, that is, supplies a current which charges the capacitor C3 and the capacitor C4 which, initially, were discharged. During this stage, the MOSFET transistor Q1 operates in the linear region of its characteristic, that is, it behaves substantially as a resistor having a variable resistance controlled by the voltage between its gate and its source.

During the stage described up to now, an excessive current cannot be supplied to the capacitor C3; the MOSFET transistor Q1 is not yet in saturation so that the voltage $V_{DS}$ between its drain and its source is quite high, for example, equal to about 2 volts, for which the dissipation in this transistor would still be too high.

When a given voltage is reached in the capacitor C3, the control circuit CC activates the charge pump CP which outputs a high voltage towards the gate of Q1.

In order to bring Q1 to saturation and hence to reduce its $V_{DS}$ and therefore the dissipation, it is necessary for the voltage $V_{GS}$ between gate and source to reach a suitable value, greater than the threshold voltage $V_{th}$, which is, for example, between about 5 V and 10 V. If the battery 5 supplies a voltage of, for example, 12 V, the output voltage of the charge pump CP must be at least about 20V.

During the operation described up to now, the interface circuit IC thus enables an initial transitory stage to be implemented after the closure of the switch 6, during which stage conduction in the MOSFET transistor Q1 is controlled in a manner such that the current increases progressively in accordance with a predetermined time constant whilst this transistor is operating in the linear region of its characteristic, so that the capacitors C3, C4, and in particular the electrolytic capacitor C3, are charged with a current of limited intensity. After this initial transitory stage, by activation of the charge pump CP, the MOS transistor Q1 is made to operate in a condition of substantial saturation, with a drastic reduction in power dissipation.

The charge pump CP can advantageously also be used for the MOSFET switches S1-S4 of the bridge driver circuit 8. In this case, when it is not necessary to drive the load L and the switches S1-S4 are therefore open, the charge pump CP is preferably switched off and the microprocessor control circuit CC is then advantageously arranged to "switch on" the charge pump CP periodically and briefly (for example, for 20 ms every 20 s, these times being determined substantially by the ratio between the capacitance of C2 and the value of the capacitance $C_{gs}$ between the gate and the source of Q1) in order to recharge the capacitor C2 which can then keep the transistor Q1 in saturation for a predetermined period of time.

Figure 5:
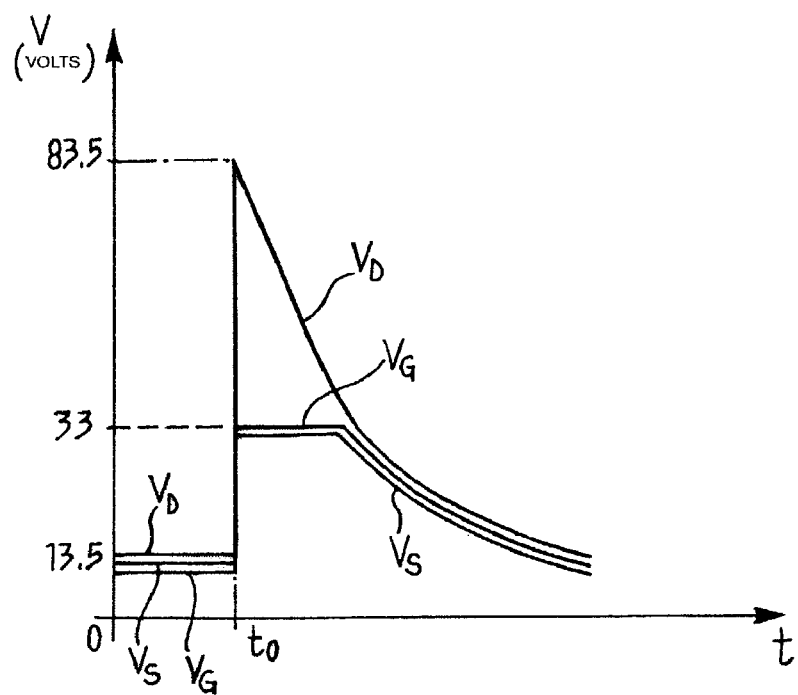

If, in operation, a so-called "load-dump" condition arises (FIG. 5, time $t_0$), a pulsed voltage of very high value of the order of about one hundred volts (or even more) appears in the capacitor C1 of the interface circuit IC and is propagated beyond the MOSFET transistor Q1; if the voltage in the diode Z1 then exceeds its Zener voltage, this diode becomes conductive and causes the transistor Q3 to become conductive. This consequently causes the MOSFET Q1 to change to the linear mode of operation (resistance controlled by the voltage $V_{GS}$). The voltage at the cathode of Z1 stabilizes at its Zener voltage (for example, 33 V); this voltage is advantageously selected so as to be tolerable without problems by the capacitor C3 and the other components disposed downstream.

In this condition, the drain-source path of the MOSFET transistor Q1 "sees" the difference between the voltage of the pulse due to the "load-dump" and the Zener voltage of the diode Z1, this difference being, for example, of the order of 50 V. It is thus possible to use a MOSFET transistor Q1 which is not excessively expensive and which is characterized by an optimal, that is, low resistance $R_{DSon}$.

Upon deactivation, that is, when the switch 6 is opened, the control circuit CC advantageously sends to the base of the transistor Q4 (via the diode D5' and the resistor R10) a "hold" signal such that the turnoff of the MOSFET transistor Q1 is delayed for some time so that the microprocessor control circuit CC can complete its processing.

Naturally, the principle of the invention remaining the same, the forms of embodiment and details of construction may be varied widely with respect to those described and illustrated purely by way of non-limiting example, without thereby departing from the scope of the invention as defined in the appended claims.

What is claimed is:

1. An interface circuit for use between a direct-current voltage source, and a circuit for the pulsed driving of a load, in parallel with which at least one high-capacitance capacitor is connected, the interface circuit comprising:

a MOSFET transistor the drain-source path of which is intended to be arranged in series between the voltage source and the circuit for driving the load in order to control the current transferred towards the load, and the gate of which is connected to control-circuit means suitable for driving the transistor in accordance with predetermined procedures, the interface circuit comprising a first supply terminal and a second supply terminal which are intended operatively to be connected to a same terminal of the voltage source, permanently and through a hand-operable switch means, respectively, the MOSFET transistor having its drain connected to the first supply terminal, the control-circuit means comprising:

a circuit for controlling current conduction, which is connected to the gate of the MOSFET transistor and which, each time it receives an activation signal, is capable of bringing about an initial transitory stage in which a progressively increasing current is conducted through the transistor in accordance with a predetermined time constant whilst this transistor is operating in the linear region of its characteristic, and a subsequent or steady-state stage in which the MOSFET transistor is operating in conditions of substantial saturation, and an enabling circuit which is connected to the second supply terminal and which can keep the MOSFET transistor non-conductive and is adapted to supply an activation signal to the circuit for controlling current conduction, when the second supply terminal is disconnected from and connected to the voltage source, respectively;

wherein the enabling circuit comprises a first electronic switch interposed between the gate of the MOSFET transistor and the earth and having a control input connected to the second supply input so that, when the second supply input is connected to the voltage source the first switch is non-conductive.

2. An interface circuit according to claim 1 in which the circuit for controlling current conduction comprises a charge pump which, when activated, is capable of causing a voltage of predetermined value greater than that supplied by the voltage source to be applied to the gate of the MOSFET transistor.

3. A circuit according to claim 2 in which the circuit for controlling current conduction comprises a first resistor and a first capacitor which are connected between the drain and the gate and between the gate and the source of the MOSFET transistor, respectively.

4. A circuit according to claim 3 in which the circuit for controlling current conduction comprises a second resistor in series with the first capacitor.

5. A circuit according to claim 2 in which the circuit for controlling current conduction comprises a first resistor and the first resistor and the output of the charge pump are connected to the gate of the MOSFET transistor in an OR arrangement.

6. A circuit according to claim 2 in which the circuit for driving the load comprises a plurality of controlled MOSFET switches with which the same charge pump that is connected to the gate of the MOSFET transistor is associated, the circuit for controlling current conduction in the MOSFET transistor comprising control means suitable for bringing about periodic activation of the charge pump when the circuit for driving the load is inactive whilst the second supply terminal is connected to the voltage source.

7. A circuit according to claim 3 in which the first resistor and the output of the charge pump are connected to the gate of the MOSFET transistor in an OR arrangement.

8. A circuit according to claim 1, further comprising a protection circuit adapted to cause the MOSFET transistor to operate in the linear region when a voltage of a value greater than a predetermined value appears at the source of the MOSFET transistor.

9. A circuit according to claim 8 in which the protection circuit comprises a Zener diode having its cathode connected to the source of the MOSFET transistor and its anode connected to the control input of a second switch disposed between the gate of the MOSFET transistor and the earth so that, when the voltage between the source of the MOSFET transistor and the earth exceeds a predetermined value, the second switch reduces the potential of the gate of the MOSFET transistor so as to cause it to operate in the linear region.

10. A circuit according to claims 1 or 8 in which first and second switches are connected substantially in parallel with one another between the gate of the MOSFET transistor and the earth.

11. A circuit according to claim 1, also having an input for a hold signal for keeping the MOSFET transistor in the operative condition in which it is situated when the second supply input is disconnected from the voltage source.

12. A circuit according to claim 11 in which the input for the hold signal is connected to the control input of the first electronic switch.

* * * * *